Patented July 3, 1945

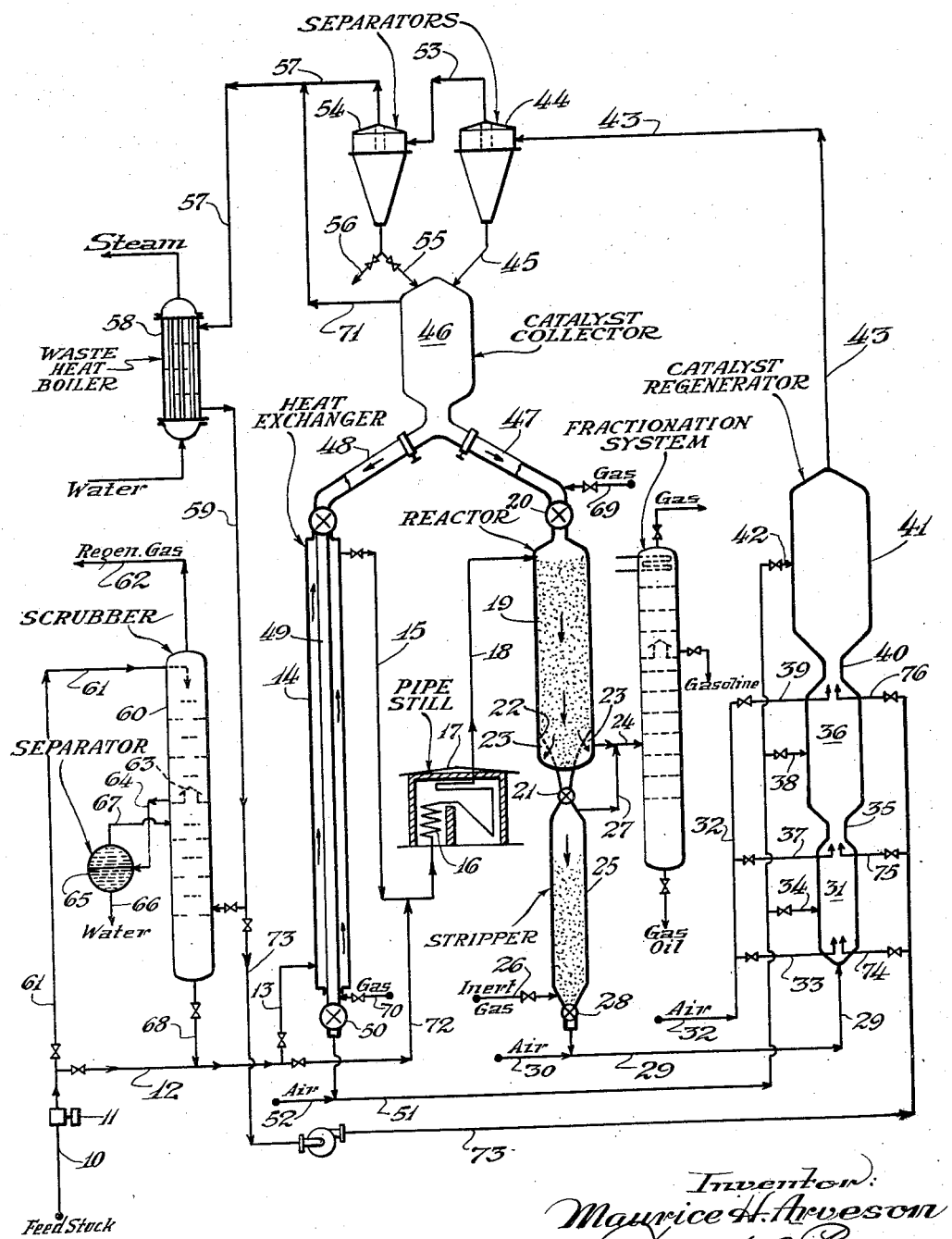

2,379,408

UNITED STATES PATENT OFFICE 2,379,408

CATALYTIC CONVERSION SYSTEM

Maurice H. Arveson, Flossmoor, Ill., assignor to Standard Oil Company, Chicago, Ill., a corporation of Indiana Application December 31, 1940, Serial No. 372,516

13 Claims. (Cl. 196—52)

This invention relates to a catalytic conversion system and it pertains more particularly to a system for converting low quality hydrocarbons into high quality motor fuel by means of solid catalysts either in granular or pelleted form.

Hydrocarbon conversion processes employing solid catalysts usually comprise a fixed bed, a moving bed, or a suspended catalyst system. In fixed bed systems the on-stream reaction is periodically interrupted and the catalyst is regenerated in situ; much time is lost in purging in regeneration operations, the problem of temperature control requires the use of cumbersome and expensive apparatus and both during reaction and regeneration, there are constantly changing temperature conditions which impair the uniformity of conversion and the uniformity of catalyst activity and changing reaction conditions, cross-overs, etc., upset the fractionation system and require expensive and cumbersome controls, etc. An object of my invention is to provide a continuous system which will overcome these difficulties.

In the moving bed conversion system the conversion is uniform and the temperature at each and every point in the converter is substantially constant. Heretofore, however, the problem of regenerating the granular or pelleted catalysts from the moving bed operation has been a serious drawback to any commercial application of the process. An object of my invention is to provide a moving bed conversion system with an improved regeneration system which will avoid catalyst degration. A further object is to provide a simpler, more economical and more efficient method and means for regenerating granular or pelleted catalysts than has heretofore been available.

Powdered or suspended catalyst has been employed with some success in hydrocarbon conversion processes but it is difficult in such processes to obtain flexibility of operation and accurate control of catalyst density, catalyst residence time, catalyst-oil contact time, vapor velocities in the reactor, etc. In other words, there is always a tendency for suspended catalyst to settle out of the suspending gas and vapor velocity must be held within rather critical limits in order to retain the amount of catalyst in the reactor for the desired amount of time with respect to the amount of hydrocarbons passing through the reactor. A reactor designed for one catalyst charging stock or set of operating conditions may be entirely unsuitable for another. Furthermore, there is always a tendency for certain particles of powdered catalyst to pass through a reactor much more rapidly than other particles which tends to decrease the overall catalyst effectiveness. An object of my invention is to avoid the disadvantage of suspended catalyst technique in the reaction zone while obtaining the advantages thereof in the regeneration zone of a hydrocarbon conversion system.

A further object of my invention is to provide an improved method aand means for utilizing the exothermic heat of catalyst regeneration. A further object is to provide an improved method and means for maintaining regeneration temperatures within narrowly defined limits. A further object is to provide improved means for utilizing exothermic heat of regeneration for preheating a charging stock. Other objects will become apparent as the detailed description of the invention proceeds.

While my invention is applicable to any catalytic conversion process which is promoted by solid catalyst, it is particularly applicable to hydrocarbon conversion processes such as catalytic cracking, reforming, isoforming, aromatization, alkylation, hydrogenation, dehydrogenation, etc. In my preferred example I will describe the application of the invention to an endothermic process of catalytic cracking but it should be understood that the invention is equally applicable to other conversion processes.

In practicing my invention I pass a preheated hydrocarbon vapor stream through a moving bed of solid, granular or pelleted catalyst particles. The amount of catalyst in this bed will depend upon the activity of the catalyst, the nature of the charging stock and the selected operating conditions. In the case of catalytic cracking where the catalyst is of the silica-alumina type such as activated bentonite or alumina deposited on or incorporated in silica gel, wherein the charging stock is gas oil and wherein the reaction is effected at about atmospheric pressure at a temperature of about 800 to 1000° F., for example 925° F., a 2,400 barrel per day plant may employ a catalyst chamber containing about 5 to 15 tons of catalyst. If long catalyst holding times are employed or if the catalyst is for some other reason relatively inactive, a reactor of much larger capacity may be required. On the other hand, if very short catalyst holding times are employed or if the catalyst is of very high activity, the reactor may be of much smaller capacity.

To obtain a given conversion at a particular temperature and pressure in a catalyst chamber of given size I may vary the catalyst residence time in the reactor since catalyst activity decreases with increased residence time. Catalyst residence time in the reactor may vary from about one minute to two hours or more. With a catalyst reactor of given size, a given conversion at a specific reaction temperture may be obtained by adjusting the relationship between space velocity and catalyst residence time, space velocity being defined as volumes of liquid gas oil charging stock per hour per volume of catalyst in the reactor and catalyst residence time being defined as the average time that catalyst remains in the reactor. Thus with an ordinary silica-alumina catalyst a given conversion may be effected with a space velocity of about 10 and a catalyst residence time of about one minute or with a space velocity of about .6 and a catalyst residence time of about two hours. Under these two very different sets of conditions approximately the same conversion may be expected. A high space velocity may be used with a low residence time and a low space velocity with a high residence time. An outstanding feature of my process is the enormous flexibility of operation, a flexibility which cannot be obtained in fixed bed operations because of variable operating conditions and regeneration difficulties and which cannot be obtained in a suspended catalyst system because of the difficulty in independently controlling both space velocity and catalyst residence time in a given reactor.

With conventional cracking catalysts the relationship between space velocity and catalyst residence time in the reactor should be $$\text{Space velocity} = \frac{a}{t^{.884}}$$

where $a$ is a constant ranging between limits 4 and 40 and is preferably about 10, and $t$ is a catalyst residence time in minutes.

In my regeneration system I not only absorb heat from the hot regeneration gases but I likewise absorb and utilize heat from a part of the regenerated catalyst and I use this cooled regenerated catalyst for controlling regeneration temperatures. Spent catalyst is regenerated while suspended in regeneration gases. The temperature of regeneration is controlled by the introduction of cooled regenerated catalyst at spaced points in the regeneration system. The hot regenerated catalyst is then separated from regeneration gases and catalyst fines and split into two streams—one of which goes directly to the moving bed reactor, the other of which goes to a jacketed catalyst standpipe wherein it is cooled for further introduction as a temperature control medium in the regenerator.

A part of the separated catalyst fines may be removed from the regeneration gases and either repelleted or utilized for making additional granular catalyst. Regeneration gases are then cooled in a waste heat boiler or heat exchanger and scrubbed with in-coming charging stock which picks up heat and residual catalyst particles from such gases before they are vented from the system. The preheated charging stock is further heated by passage through the jacket around the recycled catalyst standpipe after which it is passed through a pipe still and through the moving bed reactor.

The invention will be more clearly understood from the following detailed description read in conjunction with the accompanying drawing which forms a part of the specification and which constitutes a schematic flow diagram of my improved conversion system.

Charging stock from line 10 may be passed by pump 11 through lines 12 and 13, thence through jacket 14 and line 15 to coils 16 of pipe still 17 wherein the feed stock is substantially completely vaporized and heated to obtain a transfer line temperature of about 800 to 1000° F. or higher, preferably 950° F., at a pressure of about atmospheric to 50 pounds per square inch. The hot vapors are then passsed by transfer line 18 to the moving bed catalyst reactor chamber 19 into which catalyst is continuously or intermittenty charged by star feeder 20 and from which spent catalyst is continuously or intermittently withdrawn by star feeder 21. The catalyst is withdrawn at substantially the same rate as it was charged so that the bed of catalyst in chamber 19 gradually goes from the top to the bottom thereof. The residence time of the catalyst in this reactor may range from about one minute to two hours or more and may be, for example, about 20 minutes.

The space velocity of hydrocarbon vapors through this chamber will be dependent upon the activity of the catalyst and the catalyst residence time and may range from about .25 to 12. Thus with a residence time of one minute a space velocity of about 10 may be used and for a residence time of two hours the space velocity may be about .6. For a 20 minute residence time the space velocity may be about 2.0.

A screen hopper 22 directs the catalyst from the base of the reactor to star feeder 21 and permits the passage of reaction products into annular space 23 from which said products are withdrawn through line 24 to a conventional fractionation system.

A star feeder 21 discharges the catalyst into stripping column 25 wherein volatile hydrocarbons are removed from the catalyst by means of an inert gas such as steam or tail gases from the fractionation system which may be introduced through line 26 and withdrawn through line 27 for combination with reaction products in line 24.

Stripped catalyst is discharged from the base of stripper 25 by means of star feeder 28 into line 29 in which it is carried by means of air introduced by line 30 to catalyst regenerator 31. Additional air may be introduced at the base of the regenerator through lines 32 and 33. Regenerator 31 is preferably a large cylindrical vessel of such diameter that the upward gas velocity therein will be about 1 to 10 or more feet per second. With such gas velocities and with catalyst particles ranging from about 10 to 100 mesh in particle size there will be a tendency for the catalyst to partially settle from the ascending vapors and to give a dense liquid-like phase through which the air and combustion products find their way upwards in a manner similar to the upward flow of air through a body of water. The gases which thus leave the dense phase carry suspended catalyst out of the dense phase and upward through the regenerator at the same rate that catalyst is introduced into the regenerator. For any given catalyst this dense phase phenomena is critically dependent upon the upward gas velocity and a gas velocity should be employed that will give an average density of about 1 to 35, preferably about 10 to 20 pounds of catalyst per cubic foot.

During the combustion of the carbonaceous material carbon dioxide, carbon monoxide and steam are formed, the formation of carbon monoxide and steam giving an increase in gas volume. Furthermore, the combustion of carbonaceous material considerably elevates the temperature of the regeneration gases so that the total volume of gases leaving the regenerator is, therefore, greater than the volume entering the regenerator which means that with a uniform or decreased cross-sectional area the upward velocity of the exit gases is sufficiently great to carry away catalyst particles which have "boiled out" of the dense phase.

In order to prevent the regeneration temperature from exceeding about 1000 to 1100° F. I introduce relatively cold regenerated catalyst into regenerator 31 through line 34 at such a rate as to absorb the excess heat of combustion essentially as fast as it is formed and to thus maintain a constant regeneration temperature. The general turbulence in the dense catalyst phase effects a rapid and intimate mixture of this added catalyst with catalyst already suspended in the chamber so that the temperature in the chamber is substantially uniform in all parts thereof.

The entire regeneration may be effected in a single regeneration unit but since there is always a certain amount of by-passing or channelling, i. e. some catalyst particles being carried through the system much more rapidly than others, I prefer to effect regeneration in a plurality of stages which are so designed as to effect the formation of a dense suspended catalyst in each phase. Thus the regeneration gases in regenerator 31 may be introduced through restricted section 35 into regenerator 36 which is of such cross-sectional area that the upward vapor velocity therein will be within the critical limits desired for dense phase formation. In designing this regeneration unit provision should be made for increase of gas volume due to combustion, due to increased temperature, and due to additional air which may be introduced through line 37. As further amounts of carbon are burned from the catalyst in regenerator 36 the exothermic heat of combustion is absorbed by additional cold regenerated catalyst introduced by line 38.

Similarly additional air may be introduced by line 39 into catalyst laden gases leaving regenerator 36 through restricted outlet 40 and a third regeneration zone 41 may be employed with a cross-sectional area so designed as to once more form a dense suspended catalyst phase formation. The heat liberated in burning residual amounts of carbonaceous material from the catalyst is absorbed by relatively cold regenerated catalyst introduced by line 42.

The regenerated catalyst is then carried by regeneration gases through line 43 to centrifugal separator 44 from which catalyst is dropped through line 45 to collector 46. One stream of catalyst passes from collector 46 to line 47 to the moving bed reactor 19. Another stream of hot regenerated catalyst passes by line 48 to standpipe 49 which is surrounded by jacket 14. The incoming charging stock thus absorbs heat from this hot regenerated catalyst so that the catalyst which is discharged by star feeder 50 into line 51 and conveyed by air introduced by line 52 for reintroduction into the suspended catalyst regenerators by lines 34, 38 and 42 is at a temperature of about 400 to 900° F., for example about 800° F.

The gases from cyclone separator 44 are introduced through line 53 to cyclone separator 54 wherein additional catalyst is separated out. If this catalyst is of sufficient size to be used in the moving bed reactor without unduly increasing the pressure drop in the vapor stream, this separated catalyst may be returned to collector 46 through line 55. Otherwise, the separated catalyst is withdrawn through line 56 for repelleting or for use in the preparation of granular catalyst of desired particle size. Generally speaking, I prefer a particle size ranging from about 10 to 40 mesh although larger and smaller catalysts respectively may be used.

The hot regeneration gases from separator 54 are passed by line 57 through heat exchanger 58 which may be a waste heat boiler and line 59 to the base of scrubbing tower 60 wherein it is countercurrently scrubbed by a portion of the charging stock introduced through line 61. If the initial boiling point of this fraction of the charging stock is sufficiently high its vapor pressure is sufficiently low and the regeneration gases may be vented through the scrubber by line 62 at a temperature above the dew point of the water vapors contained therein. When it is desired to use lower temperatures in the top of the scrubber I may trap out condensed water by providing trap-out plate 63 and I may withdraw liquid from this plate through line 64 to separator 65 from which water may be withdrawn through line 66 and oil may be returned to the scrubber through line 67. Oil from the base of the scrubber passes by line 68 to line 13 and is further heated in jacket 14 before it is introduced by line 15 to furnace coils 16. The scrubbing system and the jacketed standpipe furnish a considerable amount of the heat necessary for raising the charging stock to reaction temperature. The scrubbing system likewise recovers the last traces of catalyst fines which may escape with regeneration gases from separator 54. The catalyst introduced into the reactor through feeder 20 may be at a higher temperature than the incoming vapors and may thus supply the last increment of the heat of conversion in the reactor.

Instead of employing concurrent flow of hydrocarbon vapors and catalyst in the moving bed reactor I may introduce the vapors into annular space 23 and withdraw reaction products from the top of the reactor to the fractionation system. However, I prefer the concurrent flow because it makes possible the use of higher vapor velocities through the catalyst bed than would be possible with countercurrent flow conditions. In other words, the concurrent flow avoids any tendency to suspend the catalyst in reaction vapors—flow of catalyst through the bed is actually augmented by the vapor stream which tends to prevent bridging or uneven catalyst flow. Since most of the fines which may be formed by attrition or catalyst abrasion are removed from the system through line 56 there will be no tendency toward plugging in the moving bed and the pressure drop in said bed will remain substantially constant.

To avoid any plugging in line 47, line 48 and standpipe 49 I may introduce an inert gas through lines 69 and 70, this gas being introduced in such amounts as to maintain the catalyst in fluent form. The inert gas so introduced may also act as a stripping means and the stripping gas introduced at these or other points may be vented from collector 46 from line 51 to line 57.

The temperature of recycled catalyst in standpipe 49 may be regulated by varying the amount of charging stock passed through jacket 14,—in other words, by by-passing jacket 14 by means of line 72. It should be understood, of course, that any other suitable heat exchange medium may be employed in jacket 14 instead of the charging stock and the heat thus recovered from the standpipe may be employed for regenerating steam, developing power or for any other purpose.

If the amount of air introduced into the regeneration chambers is insufficient for maintaining the desired dense catalyst phase this air may be supplemented by regeneration gas from line 68 through lines 73, 74, 75 and 76. The amount of oxygen required for combustion determines the amount of air which is introduced through lines 36, 37 and 39 and any additional amount of gas for obtaining the necessary critical gas velocities may be obtained by recycling flue gas through lines 76, 75 and 74. These recycled regeneration gases will not effect appreciable cooling and the temperature in the respective regeneration chambers is preferably controlled by the regulated introduction of relatively cool regenerated catalyst through lines 34, 38 and 42.

While I have disclosed a preferred embodiment of my invention it should be understood that I do not limit myself to any of the details hereinabove set forth since many modifications and equivalents will be apparent to those skilled in the art from the above description. Lock hopper systems or other mechanical devices may be employed instead of star feeders 20, 21, 28 and 50. Filters or other mechanical separation devices may be employed instead of cyclone separators 44 and 54. The entire system, of course, will be heavily insulated and other mechanical expedients will be apparent to those skilled in the art.

I claim:

1. In a catalytic conversion system wherein a hydrocarbon is contacted with a catalyst in a reaction zone, the catalyst is regenerated in a regeneration zone and a part of the regenerated catalyst is returned to the reaction zone while another part is recycled to the regeneration zone, the method of recovering the exothermic heat of regeneration which comprises passing separated regeneration gases through a high temperature heat exchanger whereby said gases are partially cooled, scrubbing said partially cooled gases with a high boiling portion of the feed stock whereby the feed stock picks up both heat and catalyst particles from regeneration gases and passing at least a portion of the feed stock in indirect heat exchange with the hot regenerated catalyst recycled to the regeneration step whereby the recycled catalyst is cooled for effecting temperature control in the regeneration step and the charging stock is further preheated.

2. A catalytic hydrocarbon conversion process which comprises vaporizing a hydrocarbon charging stock and passing said vapors through a conversion zone maintained at conversion temperature, continuously introducing catalyst at the top of said conversion zone and continuously withdrawing catalyst from a low point of said conversion zone at such a rate as to maintain a moving bed of catalyst in the conversion zone, employing a catalyst of such particle size and density and employing such flow conditions in the conversion zone that the catalyst is not suspended in gases or vapors but flows continuously downward in a compact moving body, continuously passing catalyst from the bottom of said conversion zone to a stripping zone, removing volatile hydrocarbons from the catalyst in said stripping zone, continuously introducing catalyst from said stripping zone in regulated amounts into a stream of an oxygen containing gas, introducing said oxygen containing gas stream together with suspended catalyst at the base of a regeneration zone, passing gases upwardly in said regeneration zone at such a rate as to maintain the catalyst in a liquid-like, dense phase, turbulent gas suspension, burning carbonaceous material from said catalyst while it is in gas suspension, separating regeneration gases from regenerated catalyst and returning at least a portion of the regenerated catalyst to the top of said conversion zone.

3. The process of claim 2 which includes the further step of removing catalyst fines from regenerated catalyst prior to the introduction of said regenerated catalyst to the top of said conversion zone.

4. The process of claim 2 wherein the regeneration is effected in a plurality of zones of gradually increasing cross-sectional area.

5. The process of claim 2 wherein the regeneration zone comprises a plurality of stages and wherein an oxygen-containing gas is separately introduced into each of said stages.

6. The process of claim 2 wherein the catalyst residence time in the reaction zone is within the approximate range of one minute to two hours, wherein the space velocity in said zone is within the approximate range of .25 to 12 volumes of liquid charging stock per hour per volume of catalyst space in the reactor and wherein the relationship between space velocity and residence time in the reactor is expressed by the formula $$\text{Space velocity} = \frac{a}{t^{1.554}}$$

where $a$ is a constant within the limits of 4 to 40 and $t$ is catalyst residence time in minutes.

7. A cyclic process for effecting endothermic catalytic conversion of hydrocarbons and exothermic catalyst regeneration wherein catalyst absorbs heat during regeneration and supplies heat to hydrocarbons undergoing conversion, which process comprises continuously withdrawing hot regenerated catalyst from a regeneration zone, introducing at least a part of said withdrawn catalyst at the top of a catalyst column in a conversion zone, passing a gasiform hydrocarbon stream through said catalyst column in the conversion zone under conditions of temperature, pressure and time of contact for effecting endothermic conversion whereby a carbonaceous deposit accumulates on the catalyst and it becomes at least partially spent, employing such flow conditions in the conversion zone that the catalyst is not suspended in the gasiform stream but flows continuously downward as a moving bed, withdrawing spent catalyst from the bottom of said column at substantially the same rate as hot catalyst is introduced at the top thereof, dispersing the withdrawn spent catalyst in a stream of oxygen containing gas, introducing said stream and dispersed catalyst at a low level in said regeneration zone, passing regeneration gases upwardly in the regeneration zone at such velocity as to maintain a dense, turbulent, liquid-like, suspended catalyst phase therein for effecting rapid and intimate mixture of added catalyst with catalyst already suspended in said zone so that the temperature in said zone is substantially uniform in all parts thereof and heat is absorbed in the catalyst undergoing regeneration, and supplying heat to said hydrocarbon stream from at least a part of said hot regenerated catalyst.

8. The process of claim 7 which includes the additional step of heating said hydrocarbons prior to their introduction into the conversion zone by indirect heat exchange with at least a part of said hot regenerated catalyst.

9. The process of claim 7 which includes the additional step of withdrawing catalyst from the regeneration zone, cooling said withdrawn catalyst from the regeneration zone and reintroducing said cooled catalyst to said regeneration zone.

10. A cyclic process for effecting endothermic catalytic conversion of hydrocarbons and exothermic catalyst regeneration wherein catalyst absorbs heat during regeneration and supplies heat to hydrocarbons undergoing conversion, which process comprises continuously withdrawing hot regenerated catalyst from a regeneration zone, aerating said withdrawn hot catalyst to maintain it in sufficiently fluent form to permit its transfer to a conversion zone solely by gas lift and gravity forces, introducing at least a part of said withdrawn hot regenerated catalyst at the top of a catalyst column in a conversion zone, passing a gasiform hydrocarbon stream through said catalyst column in a conversion zone under conversion conditions of temperature, pressure and time of contact whereby endothermic conversion is effected and a carbonaceous deposit accumulates on the catalyst so that it becomes at least partially spent, employing such flow conditions in the conversion zone that the catalyst is not suspended in the gasiform stream but flows continuously downward as a moving bed, withdrawing spent catalyst from the bottom of said column at substantially the same rate as hot catalyst is introduced at the top thereof, dispersing the withdrawn spent catalyst in a stream of oxygen containing gas and introducing said stream and dispersed catalyst at a low level in said regeneration zone, passing regeneration gases upwardly in the regeneration zone at such velocity as to maintain a dense, turbulent, liquid-like, suspended catalyst phase therein for effecting rapid and intimate mixture of added catalyst with catalyst already suspended in said zone so that the temperature in said zone is substantially uniform in all parts thereof and heat is absorbed in the catalyst which becomes regenerated and hot, and supplying heat to said hydrocarbon stream from at least a part of said hot regenerated catalyst.

11. A cyclic process for effecting endothermic catalytic conversion of hydrocarbons and exothermic catalyst regeneration wherein catalyst absorbs heat during regeneration and supplies heat to hydrocarbons undergoing conversion which process comprises continuously withdrawing hot regenerated catalyst from a regeneration zone, introducing at least a part of said withdrawn hot regenerated catalyst at the top of a catalyst column in a conversion zone, passing a gasiform hydrocarbon stream downwardly through said catalyst column under conversion conditions of temperature, pressure and time of contact whereby endothermic conversion is effected and a carbonaceous deposit accumulates on the catalyst so that it becomes at least partially spent, continuously removing catalyst at the base of said column at such a rate that the catalyst in said column moves downwardly as a bed concurrently with but at a lower velocity than the flow of the gasiform stream so that the flow of gases tends to prevent catalyst bridging, suspending the catalyst removed at the base of the column in a stream of oxygen containing gas, introducing said stream and suspended catalyst at a low level in said regeneration zone, passing regeneration gases upwardly in the regeneration zone at such velocity as to maintain a dense, turbulent, liquid-like, suspended catalyst phase therein for effecting rapid and intimate mixture of relatively cool added catalyst with catalyst already suspended in said zone so that the temperature in said zone is substantially uniform in all parts thereof and heat is absorbed in the catalyst so that the catalyst becomes hot and regenerated, and supplying heat to said hydrocarbon stream from at least a part of said hot regenerated catalyst.

12. The method of claim 7 which includes the step of stripping hydrocarbons from the relatively spent catalyst before it is dispersed in the stream of oxygen containing gas.

13. The process of claim 7 which includes the step of removing catalyst fines from hot regenerated catalyst before said catalyst is introduced at the top of the catalyst column in the conversion zone.

MAURICE H. ARVESON.